US008027103B2

(12) United States Patent
Tanaka et al.

(10) Patent No.: US 8,027,103 B2
(45) Date of Patent: Sep. 27, 2011

(54) LENS ASSEMBLY AND METHOD OF DISPOSING OPTICAL MEMBER IN CERAMIC LENS FRAME

(75) Inventors: Yasunori Tanaka, Saitama (JP); Yuya Sakai, Saitama (JP); Ikuo Taki, Odawara (JP)

(73) Assignee: Fujifilm Corporation, Tokyo (JP)

( * ) Notice: Subject to any disclaimer, the term of this patent is extended or adjusted under 35 U.S.C. 154(b) by 27 days.

(21) Appl. No.: 12/559,718

(22) Filed: Sep. 15, 2009

(65) Prior Publication Data
US 2010/0079876 A1 Apr. 1, 2010

(30) Foreign Application Priority Data

Sep. 30, 2008 (JP) .................. 2008-254771

(51) Int. Cl.
G02B 7/02 (2006.01)

(52) U.S. Cl. .................. 359/819; 359/811; 359/822

(58) Field of Classification Search ........... 359/811–826
See application file for complete search history.

(56) References Cited

U.S. PATENT DOCUMENTS

| 4,281,916 A | | 8/1981 | Aoyagi | |
|---|---|---|---|---|
| 5,502,598 A | * | 3/1996 | Kimura et al. ........... | 359/814 |
| 5,523,815 A | * | 6/1996 | Tamura ................. | 396/508 |
| 5,719,711 A | | 2/1998 | Shiba | |
| 5,781,351 A | | 7/1998 | Murakami et al. | |
| 5,864,739 A | | 1/1999 | Kaneko et al. | |
| 6,144,509 A | | 11/2000 | Baker | |
| 6,424,473 B1 | | 7/2002 | Nakane et al. | |
| 7,576,930 B2 | | 8/2009 | Yu | |
| 2001/0040740 A1 | | 11/2001 | Funakoshi | |
| 2004/0197038 A1 | * | 10/2004 | Fujita et al. ........... | 384/293 |
| 2006/0152826 A1 | | 7/2006 | Tsutsui | |
| 2006/0204781 A1 | * | 9/2006 | Takei ................. | 428/688 |
| 2007/0076309 A1 | | 4/2007 | Shimizu et al. | |
| 2007/0188699 A1 | | 8/2007 | Cech et al. | |
| 2007/0191209 A1 | | 8/2007 | Hyuga et al. | |
| 2008/0031103 A1 | | 2/2008 | Horinouchi et al. | |
| 2008/0055754 A1 | | 3/2008 | Sakamoto | |
| 2008/0070815 A1 | * | 3/2008 | Kamada et al. ......... | 508/107 |
| 2008/0252775 A1 | | 10/2008 | Ryu et al. | |
| 2009/0103193 A1 | | 4/2009 | Berube | |
| 2009/0244726 A1 | | 10/2009 | Sakai et al. | |

FOREIGN PATENT DOCUMENTS

JP 1-243245 * 9/1989

(Continued)

OTHER PUBLICATIONS

JP 2002-23091, translation.*

(Continued)

*Primary Examiner* — Mohammed Hasan
(74) *Attorney, Agent, or Firm* — Birch Stewart Kolasch & Birch, LLP

(57) ABSTRACT

A lens assembly has: optical members including lenses and spacing rings; and a ceramic lens frame into which the optical members are inserted. A solid lubricant is applied to at least one of a part of the inner peripheral surface of the ceramic lens frame, which part is to be in contact with at least the outer peripheral surfaces of the optical members, and the outer peripheral surfaces of the optical members. Subsequently, the lenses and spacing rings are alternately inserted into the ceramic lens frame and then pressed by a pressing ring.

14 Claims, 3 Drawing Sheets

FOREIGN PATENT DOCUMENTS

| | | | |
|---|---|---|---|
| JP | 2000-357333 | A | 12/2000 |
| JP | 2001-027723 | | 1/2001 |
| JP | 2002-23091 | * | 1/2002 |
| JP | 2006-284991 | A | 10/2006 |
| JP | 2006-292927 | A | 10/2006 |
| JP | 2007-94242 | | 4/2007 |
| JP | 2007-199235 | | 8/2007 |
| JP | 2007-238430 | A | 9/2007 |
| JP | 2007-279557 | A | 10/2007 |
| JP | 2008-254769 | A | 9/2008 |
| JP | 2008-254772 | A | 9/2008 |
| JP | 2008-254773 | A | 9/2008 |
| JP | 2008-254775 | A | 9/2008 |
| JP | 2009-206117 | A | 9/2009 |
| JP | 2008-88528 | A | 10/2009 |
| JP | 2009-296542 | | 12/2009 |

OTHER PUBLICATIONS

JP 2002-23091, abstract.*

JP 1-243245, translation.*

Office Action dated Oct. 15, 2009 issued in co-pending U.S. Appl. No. 12/404,017.

Chen Jianmin et al., "*Developing Situation and Application of Bonded Solid Lubricant Films*". TRIBOLOGY, vol. 14, No. 2 pp. 180-189, Apr. 1994.

Chinese Office Action issued in corresponding Chinese Patent Application No. 200910253004.X on Dec. 31, 2010.

Chinese Office Action issued on Jan. 11, 2011 in Chinese Application No. 200910205755.4 corresponding to copending U.S. Appl. No. 12/559,699.

JPO Notification issued on Apr. 6, 2011 in foreign application JP 2008-254769 corresponding to copending U.S. Appl. No. 12/559,783.

Notice of Allowance issued in co-pending U.S. Appl. No. 12/559,783 on Jan. 6, 2011.

U.S. Office Action issued in co-pending U.S. Appl. No. 12/559,680 on Dec. 27, 2010.

U.S. Office Action issued in co-pending U.S. Appl. No. 12/559,699 dated Dec. 29, 2010.

Notice of Allowance issued in copending U.S. Appl. No. 12/559,699 dated May 25, 2011.

Notice of Allowance issued in copending U.S. Appl. No. 12/559,783 dated May 13, 2011.

* cited by examiner

LENS ASSEMBLY AND METHOD OF DISPOSING OPTICAL MEMBER IN CERAMIC LENS FRAME

BACKGROUND OF THE INVENTION

1. Field of the Invention

The present invention relates to a lens assembly equipped with an optical member and a ceramic lens frame having a hollow part into which the optical member is inserted, and to a method of disposing the optical member in the ceramic lens frame of the lens assembly.

2. Description of the Related Art

In recent years, automobiles have been provided with cameras. Meanwhile, nowadays, automobiles are equipped with display screens thanks to the widespread use of car navigation systems. Therefore, many of cameras installed in automobiles can display the state of a blind spot for a driver on a display screen provided in front of the driver's seat. Incidentally, automobiles may be left outdoors in hot summer and in freezing winter and therefore, a camera installed in an automobile is required to operate properly over an extremely wide range of temperatures. In order to guarantee the proper operation of a vehicle-mounted camera, a lens assembly employed in such a camera needs to be not only lightweight and robust as generally required, but also resistant to stretching and shrinking with temperature for the purpose of preventing the occurrence of a blur due to a change in temperature. To meet these needs, ceramic lens frames have been devised (see, for example, Japanese Patent Application Publications No. 2006-284991 and No. 2006-292927). Also, the inventors of the present application have proposed to apply porous ceramic to an optical component (see, for example, Japanese Patent Application Publication No. 2007-238430). The porosity of the porous body described in the specification of Japanese Patent Application Publication No. 2007-238430 is equal to or more than 10%.

Further, for instance, Japanese Patent Application Publication No. 2007-279557 describes a lens assembly having such a structure that lenses and spacing rings are inserted into a lens barrel through the front opening of the lens barrel, and a pressing ring is screwed on a front part of the lens barrel, thereby fixing the lenses to the lens barrel. A structure in which a ceramic lens frame is applied to the structure of Japanese Patent Application Publication No. 2007-279557 will be described.

FIG. 1 is a diagram that illustrates an example of the structure of a lens assembly having a lens frame made of ceramic including porous ceramic. The structure of the lens assembly will be briefly described with reference to FIG. 1.

A lens assembly 1 illustrated in FIG. 1 is provided with a lens frame 10 made of ceramic, and the lens frame 10 has a hollow part 100 having an object-side opening 101 and an image-forming-side opening 102. Formed on an object-side periphery of the lens frame 10 is a male thread SR1. From the object-side opening 101, lenses L1 trough L4 and spacing rings SP1 through SP3 are inserted while being aligned along the optical axis. In this example, the lenses L1 trough L4 and the spacing rings SP1 through SP3 are alternately disposed and sequentially inserted into the hollow part 100 of the lens frame 10.

Furthermore, the lens assembly 1 illustrated in FIG. 1 is provided with a pressing ring 11 that fixes the lenses L1 trough L4 and the spacing rings SP1 through SP inserted into the hollow part 100 of the lens frame 10, by pressing them from the side where the object-side opening 101 is formed. The pressing ring 11 has: a mounting opening 110 into which an object-side part of the lens frame 10 is inserted; and an optical opening 111 for making a central part of the lens L1 exposed. Among the lenses inserted into the lens frame, the lens L1 is the one disposed at the position closest to the object. Formed on an inner wall on a mounting opening side of the pressing ring 11 is a female thread SR2 in which the male thread SR1 is engaged. When the male thread SR1 is engaged in the female thread SR2, the edge of an object-side surface of the lens L1 disposed at the position closest to the object on the object side is pressed by the pressing ring 11.

The lens assembly 1 shown in FIG. 1 is assembled by using the pressing ring 11 that presses the lenses L1 trough L4 and the spacing rings SP1 through SP3 in the lens frame 10 toward the image-forming-side opening.

When the material of the lens assembly 1 illustrated in FIG. 1 is ceramic, the lens assembly 1 has such a drawback that it is more difficult to smoothly insert the lenses L1 trough L4 and the spacing rings SP1 through SP3 as compared to when the material is a metal or the like, because the inner peripheral surface of the lens frame 10 made of ceramic is uneven. If optical members such as the lenses and spacing rings cannot be smoothly inserted into the hollow part 100 of the lens frame 10, the rim of any of the optical members may be chipped or the optical members may not be disposed at predetermined positions within the lens frame 10. When the lens assembly has the optical members whose rim is chipped or which are not placed at correct positions, it is impossible for a camera mounted with such a lens assembly to deliver appropriate optical performance.

SUMMARY OF THE INVENTION

In view of the above circumstances, the present invention provides a lens assembly that maintains excellent optical performance and a method of disposing an optical member in a ceramic lens frame of the lens assembly.

A lens assembly according to the present invention includes:

an optical member including a lens; and a ceramic lens frame having a hollow part which has openings formed at both ends thereof and into which the optical member is inserted while sliding against an inner peripheral surface forming the hollow part, wherein a solid lubricant is applied to at least one of a part of the inner peripheral surface, which part is to be in contact with at least an outer peripheral surface of the optical member, and the outer peripheral surface of the optical member.

According to the lens assembly described above, the solid lubricant is applied to at least one of: the part of the inner peripheral surface, which part is to be in contact with at least the outer peripheral surface of the optical member; and the outer peripheral surface of the optical member. Subsequently, the optical member is inserted by being smoothly slid against the inner peripheral surface of the ceramic lens frame. Therefore, the rim of the optical member is prevented from chipping and the optical member is disposed at a correct position. For this reason, a camera into which the lens assembly described above is incorporated can sufficiently deliver predetermined optical performance.

In addition, since the solid lubricant is employed here, it is possible to prevent such a problem that when, for example, a liquid lubricant is used, optical performance of a lens assembly deteriorates due to the liquid lubricant flowing out.

In other words, according to the present invention, there is realized a lens assembly that maintains excellent optical performance.

Here, in the lens assembly of the present invention, the solid lubricant may contain a solid lubricant component and a binder, the solid lubricant component having, as a lubricant main ingredient, at least any one selected from molybdenum disulfide, graphite and PTFE, and the binder being made of at least any one selected from polyamideimie resin, epoxy resin and acrylic-based resin. Further, the solid lubricant may be a dry film made of at least one of thermoplastic resin and thermosetting resin.

The solid lubricant having any of the additional features described above forms a lubricant film suitable for the surface of the ceramic forming the lens frame described above.

Here, in the lens assembly of the present invention, the ceramic lens frame may be made of porous ceramic.

The "porous" ceramic has a porosity equal to or more than 10%.

There are various types of ceramic including the porous ceramic described above. The porous ceramic has a low reflectivity in a visible-light area and thus is suitably applied to a lens frame of a camera. However, since the porous ceramic has a high porosity, the surface of the porous ceramic is more uneven than ordinary types of ceramic. When the solid lubricant as described above is used, even though the ceramic is porous, entering its pores can be prevented and thus a sufficient effect can be achieved.

Furthermore, a method according to the present invention is a method of disposing an optical member in a ceramic lens frame, by inserting the optical member including a lens in a hollow part of the ceramic lens frame, the hollow part having openings formed at both ends thereof, and the optical member being inserted into the hollow part while sliding against an inner peripheral surface forming the hollow part, the method including the steps of:

applying a solid lubricant to at least one of a part of the inner peripheral surface, which part is to be in contact with at least an outer peripheral surface of the optical member, and the outer peripheral surface of the optical member; and inserting the optical member into the hollow part of the ceramic lens frame.

According to the method of disposing the optical member in the ceramic lens frame of the present invention, the optical member including the lens is smoothly inserted into the ceramic lens frame, because the optical member is inserted after the solid lubricant is applied.

DETAILED DESCRIPTION OF THE INVENTION

An embodiment of the present invention will be described.

Figure 2:
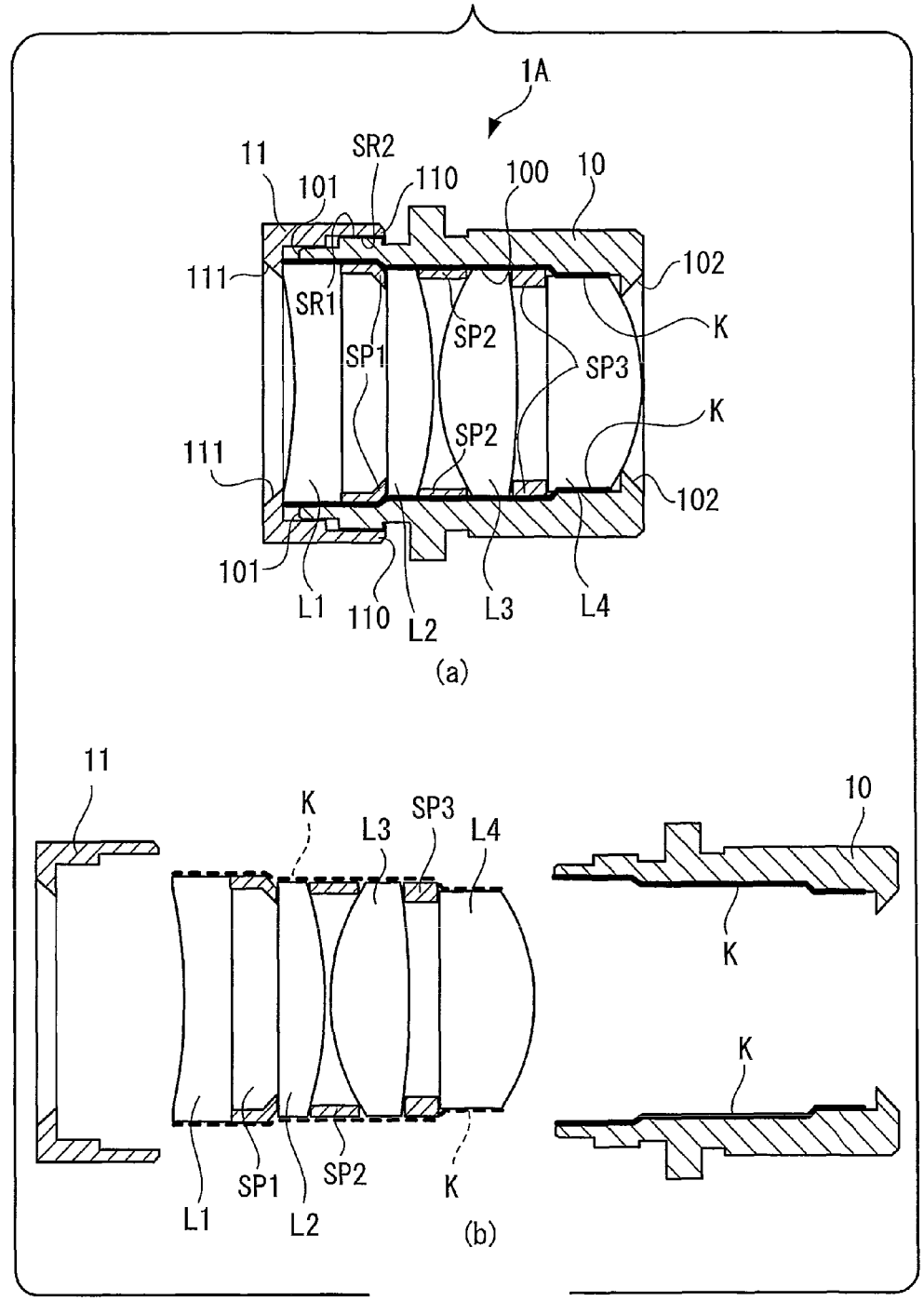
FIG. 2 is a diagram that depicts the structure of a lens assembly according to an embodiment of the present invention.

FIG. 2 is a diagram that depicts the structure of a lens assembly 1A of the present embodiment.

Figure 1:
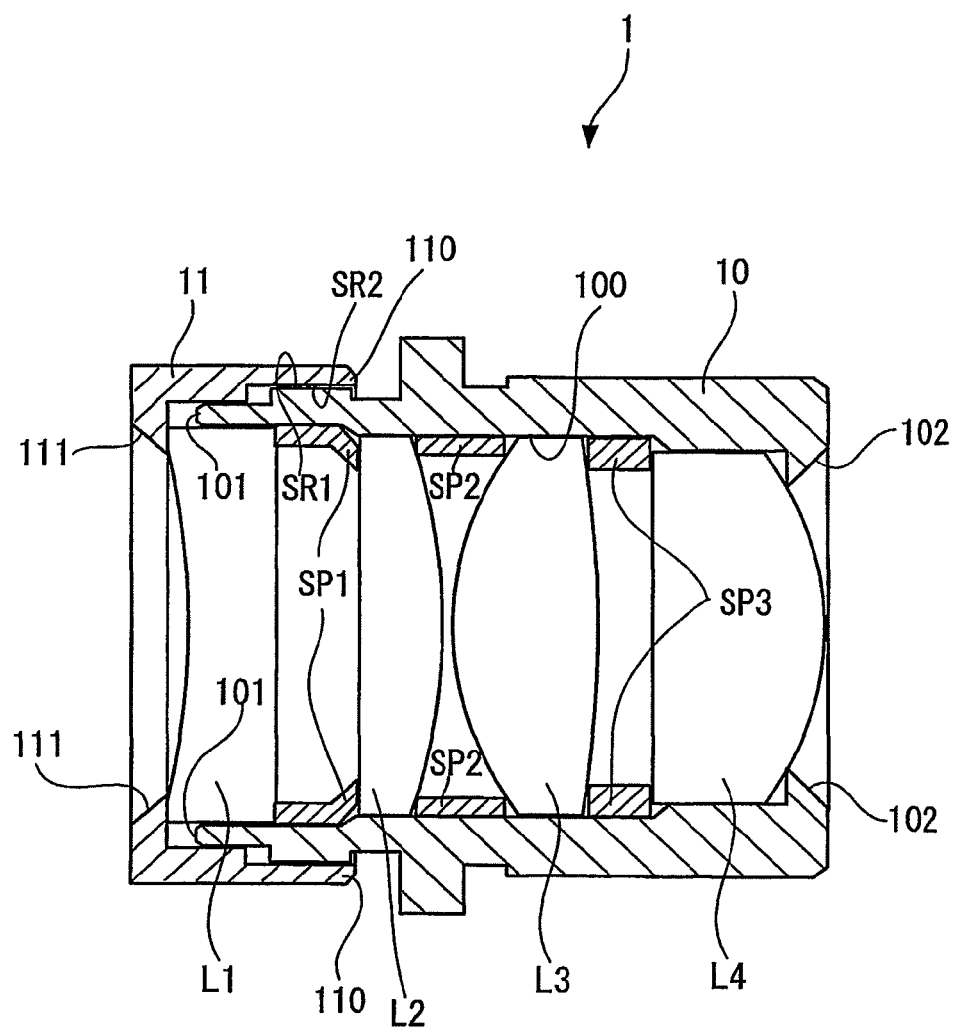
FIG. 1 is a diagram that illustrates an example of the structure of a lens assembly having a lens frame made of ceramic.

Part (a) of FIG. 2 is the same as FIG. 1 except that a solid lubricant K is applied. Part (b) of FIG. 2 illustrates a pressing ring 11, a lens frame 10 and a lens group (lenses L1 through L4) in an exploded state.

As illustrated in part (b) of FIG. 2, after the lubricant K is applied to a part of the inner peripheral surface of the lens frame 10, which part is to be in contact with at least the outer peripheral surfaces of optical members, the lenses L1 through L4 and spacing rings SP1 through SP3 serving as the optical members are inserted into the lens frame 10. In this structure, the lenses L1 through L4 and spacing rings SP1 through SP3 are smoothly inserted into the lens frame 10, which prevents the rim of any of the lenses L1 through L4 from being chipped and also allows the optical members including the lenses L1 through L4 and spacing rings SP1 through SP3 to be disposed at correct positions. As a result, it is possible for a camera into which the lens assembly 1A shown in FIG. 2 is incorporated to deliver predetermined optical performance.

Incidentally, in the above description of the embodiment illustrated in FIG. 2, the solid lubricant K is applied to the part of the inner peripheral surface of the lens frame 10, which part is to be in contact with at least the outer peripheral surfaces of the optical members. However, the solid lubricant K may be applied to the outer peripheral surfaces of the lenses L1 through L4 and spacing rings SP1 through SP3 serving as the optical members and subsequently, the optical members may be inserted into the lens frame 10. Alternatively, the solid lubricant K may be applied to both: the part of the inner peripheral surface of the lens frame 10, which part is to be in contact with at least the outer peripheral surfaces of the optical members; and the outer peripheral surfaces of the lenses L1 through L4 and spacing rings SP1 through SP3 serving as the optical members.

The solid lubricant K preferably contains: a solid lubricant component having, as a lubricant main ingredient, at least any one selected from molybdenum disulfide, graphite and PTFE (polytetrafluoroethylene resin); and a binder made of at least any one selected from polyamideimie resin, epoxy resin and acrylic-based resin. The solid lubricant K having such a composition properly conforms to the surface of ceramic, so that the lenses L1 through L4 and spacing rings SP1 through SP3 serving as the optical members can be inserted in a sufficiently smooth manner.

Further, the solid lubricant K may be formed by a dry film made of thermoplastic resin or thermosetting resin. In this case however, if a lubricant of liquid thermoplastic resin or thermosetting resin is applied to the outer peripheral surfaces of the lenses, the applied lubricant may flow onto the surface of the lenses. Therefore, preferably, the optical members are inserted after the lubricant is applied to the inner peripheral surface of the lens frame and dried, thereby forming a dry film that serves as a solid lubricant.

As described above, use of the solid lubricant makes it possible to smoothly insert the optical members into the hollow part of the lens frame, preventing such problems that the rim of each of the optical members is chipped and each of the optical members is not placed at correct positions, so that a camera containing the lens assembly 1A illustrated in FIG. 2 can sufficiently deliver predetermined optical performance.

Now, there will be described a method of disposing the optical members in the lens frame 10 made of ceramic, provided in the lens assembly 1A illustrated in FIG. 2.

Figure 3:
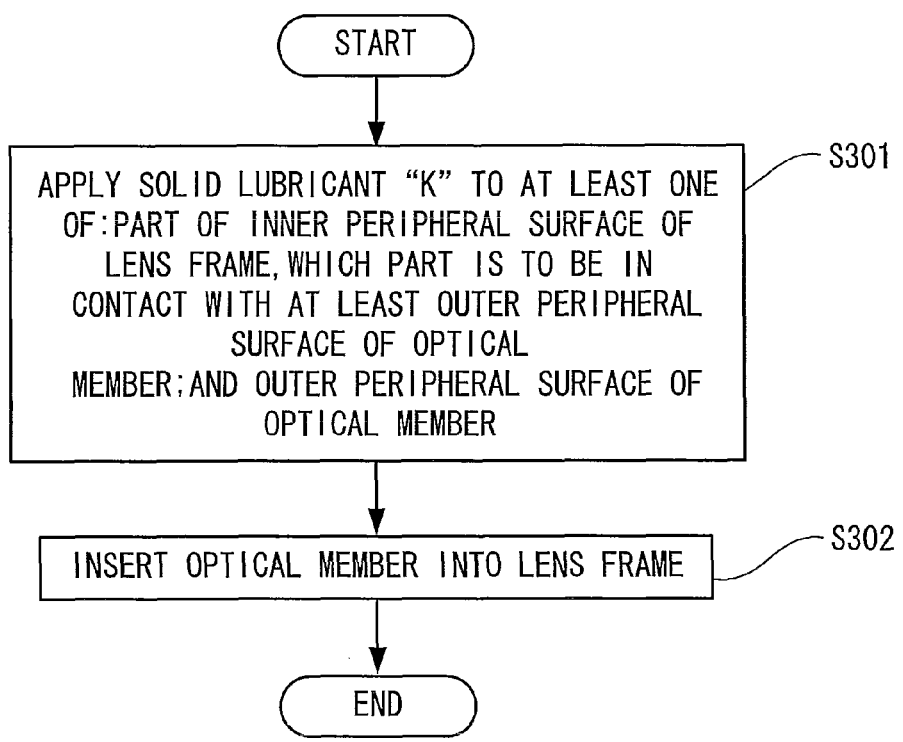
FIG. 3 is a diagram for describing a method of disposing optical members in a lens frame made of ceramic according to an embodiment of the present invention.

FIG. 3 is a diagram for describing, the method of disposing the optical members in the lens frame 10 made of ceramic.

As shown in FIG. 3, at first, in a lubricant application process S301, the solid lubricant K is applied to at least one of: the part of the inner peripheral surface of the lens frame 10, which part is to be in contact with at least the outer peripheral surfaces of the optical members; and the outer peripheral surfaces of the optical members (the lenses L1 through L4 and spacing rings SP1 through SP3). Subsequently, the optical members are inserted into the hollow part 100 of the lens frame 10 in an assembling process S302.

When the solid lubricant K is applied in the lubricant application process S301 as shown in FIG. 3, the optical members can be smoothly inserted into the hollow part 100 of the lens frame 10. The work for applying the solid lubricant K is easy and does not require a long time, thereby achieving an effect of avoiding an increase in production cost.

As described above, there are realized a lens assembly that maintains excellent optical performance and a method of disposing an optical member in a ceramic lens frame of the lens assembly.

What is claimed is:

1. A lens assembly comprising:
   a plurality of lenses,
   a plurality of spacing rings each of which has a shape of a ring, and
   a ceramic lens frame having a hollow part which has openings formed at both ends thereof and into which the plurality of lenses and the plurality of spacing rings are inserted while sliding against an inner peripheral surface of the ceramic lens frame, the inner peripheral surface forming the hollow part,
   wherein
   the plurality of lenses are respectively disposed at a plurality of predetermined positions in the hollow part along a direction connecting said both ends so that peripheries of the plurality of lenses contact the inner peripheral surface,
   the plurality of spacing rings are disposed in the hollow part along said direction in such a manner that one of the plurality of spacing rings is positioned between two peripheries of each neighboring pair of the plurality of lenses and contacts the two peripheries and the inner peripheral surface, to dispose the plurality of lenses at the plurality of predetermined positions, and
   contact surface portions of the inner peripheral surface have at least one solid lubricant thereon, said contact surface portions contacting the peripheries of the plurality of lenses and the plurality of spacing rings.

2. The lens assembly according to claim 1, wherein the solid lubricant contains a solid lubricant component and a binder, the solid lubricant component having, as a lubricant main ingredient, at least any one selected from molybdenum disulfide, graphite and PTFE, and the binder being made of at least any one selected from polyamideimie resin, epoxy resin and acrylic-based resin.

3. The lens assembly according to claim 1, wherein the solid lubricant is a dry film made of at least one of thermoplastic resin and thermosetting resin.

4. The lens assembly according to claim 2, wherein the solid lubricant is a dry film made of at least one of thermoplastic resin and thermosetting resin.

5. The lens assembly according to claim 1, wherein the ceramic lens frame is made of porous ceramic.

6. The lens assembly according to claim 2, wherein the ceramic lens frame is made of porous ceramic.

7. The lens assembly according to claim 3, wherein the ceramic lens frame is made of porous ceramic.

8. A method of disposing at least one lens of a plurality of lenses in a ceramic lens frame, by inserting the at least one lens in a hollow part of the ceramic lens frame, the hollow part having openings formed at both ends thereof, wherein the plurality of lenses and a plurality of spacing rings are to be inserted in the hollow part while sliding against an inner peripheral surface of the ceramic lens frame, the inner peripheral surface forming the hollow part, and wherein each of the plurality of spacing rings has a shape of a ring, the method comprising the steps of:
   applying at least one solid lubricant to contact surface portions of the inner peripheral surface, wherein said contact surface portions are to contact peripheries of the plurality of lenses and the plurality of spacing rings; and
   inserting the plurality of lenses at a plurality of predetermined positions in the hollow part of the ceramic lens frame along a direction connecting said both ends so that the peripheries of the plurality of lenses contact the inner peripheral surface,
   wherein the plurality of spacing rings are disposed in the hollow part along said direction in such a manner that one of the plurality of spacing rings is positioned between two peripheries of each neighboring pair of the plurality of lenses and contacts the two peripheries and the inner peripheral surface, to dispose the plurality of lenses at the plurality of predetermined positions.

9. The method according to claim 8, wherein the solid lubricant contains a solid lubricant component and a binder, the solid lubricant component having, as a lubricant main ingredient, at least any one selected from molybdenum disulfide, graphite and PTFE, and the binder being made of at least any one selected from polyamideimie resin, epoxy resin and acrylic-based resin.

10. The method according to claim 8, wherein the solid lubricant is a dry film made of at least one of thermoplastic resin and thermosetting resin.

11. The method according to claim 9, wherein the solid lubricant is a dry film made of at least one of thermoplastic resin and thermosetting resin.

12. The method according to claim 8, wherein the ceramic lens frame is made of porous ceramic.

13. The method according to claim 9, wherein the ceramic lens frame is made of porous ceramic.

14. The method according to claim 10, wherein the ceramic lens frame is made of porous ceramic.

* * * * *